(12) United States Patent
Nesbitt

(10) Patent No.: US 6,277,920 B1
(45) Date of Patent: Aug. 21, 2001

(54) GOLF BALL CORES FORMED FROM ULTRA-HIGH MOONEY VISCOSITY BUTADIENE RUBBER

(75) Inventor: R. Dennis Nesbitt, Westfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/226,340

(22) Filed: Jan. 6, 1999

Related U.S. Application Data

(63) Continuation-in-part of application No. 08/819,945, filed on May 18, 1997, now Pat. No. 5,895,105, which is a continuation of application No. 08/370,224, filed on Jan. 9, 1995, now abandoned, which is a continuation of application No. 07/893,277, filed on Jun. 4, 1992, now abandoned, which is a continuation-in-part of application No. 07/874,066, filed on Apr. 24, 1992, now abandoned.

(51) Int. Cl.$^7$ .............................. A63B 37/06; C08L 9/00
(52) U.S. Cl. ...................... 525/274; 525/304; 473/372; 473/373; 473/374; 473/375
(58) Field of Search ...................... 525/274, 304; 473/372, 373, 374, 377

(56) References Cited

U.S. PATENT DOCUMENTS

| | | |
|---|---|---|
| Re. 35,293 | 7/1996 | Hiraoka et al. . |
| 3,421,766 | 1/1969 | Chmiel et al. . |
| 3,432,165 | 3/1969 | Haines et al. . |
| 3,478,132 | 11/1969 | Randolph . |
| 3,572,721 | 3/1971 | Harrison et al. . |
| 3,883,145 | 5/1975 | Cox et al. . |
| 4,076,255 | 2/1978 | Moore . |
| 4,082,288 | 4/1978 | Martin et al. . |
| 4,264,075 | 4/1981 | Miller et al. . |
| 4,266,772 | 5/1981 | Martin et al. . |
| 4,328,133 | 5/1982 | Ogawa et al. . |
| 4,683,257 | 7/1987 | Kakiuchi et al. . |
| 4,696,475 | 9/1987 | Tomita et al. . |
| 4,721,749 | * 1/1988 | Odar . |
| 4,726,590 | 2/1988 | Molitor . |
| 4,838,556 | 6/1989 | Sullivan . |
| 4,844,471 | 7/1989 | Terence et al. . |
| 4,852,884 | 8/1989 | Sullivan . |
| 4,929,678 | 5/1990 | Hamada et al. . |
| 4,931,376 | 6/1990 | Hattori et al. . |
| 4,955,613 | 9/1990 | Gendreau et al. . |
| 4,974,852 | 12/1990 | Hiraoka et al. . |
| 4,984,803 | 1/1991 | Llort et al. . |
| 4,986,545 | 1/1991 | Sullivan . |
| 5,082,285 | 1/1992 | Hamada et al. . |
| 5,098,105 | 3/1992 | Sullivan . |
| 5,120,791 | 6/1992 | Sullivan . |
| 5,131,662 | 7/1992 | Pollitt . |
| 5,187,013 | 2/1993 | Sullivan . |
| 5,209,485 | 5/1993 | Nesbitt et al. . |
| 5,215,308 | 6/1993 | Hiraoka . |
| 5,306,760 | 4/1994 | Sullivan . |
| 5,312,857 | 5/1994 | Sullivan . |
| 5,324,783 | 6/1994 | Sullivan . |
| 5,328,959 | 7/1994 | Sullivan . |
| 5,330,837 | 7/1994 | Sullivan . |
| 5,338,610 | 8/1994 | Sullivan . |
| 5,542,677 | 8/1996 | Sullivan et al. . |
| 5,548,045 | * 8/1996 | Goto . |
| 5,580,057 | 12/1996 | Sullivan et al. . |
| 5,585,440 | 12/1996 | Yamada et al. . |
| 5,591,803 | 1/1997 | Sullivan et al. . |
| 5,691,429 | * 11/1997 | Van Der Arend . |
| 5,733,206 | 3/1998 | Nesbitt et al. . |
| 5,905,125 | * 5/1999 | Tsujimoto . |

FOREIGN PATENT DOCUMENTS

| | | |
|---|---|---|
| 674595 | 11/1963 | (CA) . |
| 713631 | 7/1965 | (CA) . |
| 963380 | 6/1978 | (GB) . |

\* cited by examiner

Primary Examiner—David J. Buttner

(57) ABSTRACT

The present invention is directed to improved polybutadiene compositions suitable for use in molded golf ball core construction. The improved polybutadiene compositions are composed of a particular type of solid polybutadiene which has the effect of increasing the resiliency of the resulting molded cores. Also disclosed are improved golf ball cores, and balls utilizing such cores, formed from particular ultra-high Mooney viscosity polybutadiene.

21 Claims, 2 Drawing Sheets

GOLF BALL CORES FORMED FROM ULTRA-HIGH MOONEY VISCOSITY BUTADIENE RUBBER

CROSS REFERENCE TO RELATED APPLICATIONS

This is a continuation-in-part of U.S. application Ser. No. 08/819,945 filed Mar. 18, 1997, now U.S. Pat. No. 5,895,105; which is a continuation of U.S. application Ser. No. 08/370,224 filed Jan. 9, 1995, now abandoned; which is a continuation of U.S. application Ser. No. 07/893,277 filed Jun. 4, 1992, now abandoned; and which is a continuation-in-part of U.S. application Ser. No. 07/874,066 filed Apr. 24, 1992, now abandoned.

FIELD OF THE INVENTION

The present invention is directed to improved polybutadiene compositions for use in molded golf ball cores. The improved polybutadiene compositions utilize a particular solid butadiene rubber that exhibits an ultra-high Mooney viscosity and/or a high molecular weight and a low dispersity. The use of such butadiene rubber increases the resiliency of the ball without increasing the hardness of the ball. The present invention is also directed to golf cores and balls produced by utilizing the improved polybutadiene compositions.

BACKGROUND OF THE INVENTION

Two of the principal properties involved in the performance of golf balls are resilience and hardness. Resilience is determined by the coefficient of restitution (referred to as "C.O.R."), also expressed as the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter. The lower the compression value, the harder the material.

Resilience (C.O.R.), along with additional factors such as clubhead speed, angle of trajectory, and ball configuration (i.e. dimple pattern), generally determine the distance a ball will travel when hit. Since clubhead speed and the angle of trajectory are factors not easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and electronically measuring the ball's incoming and outgoing velocity. The coefficient of restitution must be carefully controlled in all commercial golf balls in order for the ball to be within the specifications regulated by the United States Golfers Association ("U.S.G.A."). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

Polybutadiene has been utilized in forming golf ball cores. Prior artisans have investigated utilizing various grades of polybutadiene in core compositions. For example, such attempts are described in U.S. Pat. Nos. 4,929,678; 4,974,852; 5,082,285; and 5,585,440, all of which are hereby incorporated by reference. Although some of the core compositions described in these patents are satisfactory, a need remains for an improved composition for forming golf ball cores.

For example, U.S. Pat. No. 4,929,678 relates to a golf ball formed from a polybutadiene core composition having a broad Mooney viscosity of 45–90, preferably 50–70, and more preferably 55 to 65. However the dispersity of the core composition is limited to the range of 4.0 to 8.0, and preferably 4.0 to 6.0. According to the '678 patent, a dispersity of less then 4.0 produces deleterious workability.

Similarly, U.S. Pat. No. 5,082,285 generally discloses the preparation of a solid golf ball from an ultra-high molecular weight polybutadiene having a number average molecular weight of $40 \times 10^4$ or more, which has dispersity characteristics as noted. See also U.S. Pat. Nos. 4,974,852 and 5,585,440, wherein Mooney viscosity is discussed without reference to dispersity.

Accordingly, it is an object of the present invention to provide an improved polybutadiene composition which, when utilized to formulate golf ball cores, produces golf balls exhibiting enhanced C.O.R. without increasing hardness. An additional object of the invention is to produce a golf ball core from a polybutadiene composition having a high Mooney viscosity and/or a high molecular weight and low dispersity.

These and other objects and features of the invention will be apparent from the following summary and description of the invention and from the claims.

SUMMARY OF THE INVENTION

The present invention achieves all of the foregoing objectives and provides, in a first aspect, a golf ball comprising a core formed from a composition that utilizes a particular solid polybutadiene, which prior to curing, has a Mooney viscosity of at least 70 and a dispersity of less than 4. The golf ball also comprises a cover disposed about the core.

In another aspect, the present invention provides a golf ball comprising a core formed from a composition including (i) from about 80 parts to about 120 parts by weight of elastomer components and (ii) at least 60 parts by weight of non-elastomer components. The elastomer components include a solid polybutadiene, which, prior to curing, exhibits a Mooney viscosity of from about 73 to about 85 and a dispersity of about 1.9 to about 3.9. The golf ball further includes one or more polymeric cover layers disposed about the core.

In yet another aspect, the present invention provides a composition adapted for forming a golf ball core. The composition comprises a first certain type of solid polybutadiene having a Mooney viscosity of from about 73 to about 85 and a dispersity of less than 4, and preferably 3.9 or less. The polybutadiene is synthesized in the presence of a cobalt or cobalt-based catalyst.

In still another aspect, the present invention provides a golf ball comprising a core formed from a solid polybutadiene, a cross-linking agent, a metal soap and zinc oxide, the polybutadiene has a Mooney viscosity of greater than 70, and a polydispersity of from about 1.9 to about 3.9. The golf ball also includes one or more cover layers generally surrounding the core.

Furthermore, the present invention provides methods for producing the noted golf balls. Such methods generally involve combining the noted polybutadiene with at least one other agent to form a core composition. The core composition is then molded to form a golf ball core, about which a cover is formed to thereby produce the present invention golf balls.

Further scope of the applicability of the invention will become apparent from the detailed description provided below.

DETAILED DESCRIPTION OF THE PREFERRED EMBODIMENTS

Figure 1:
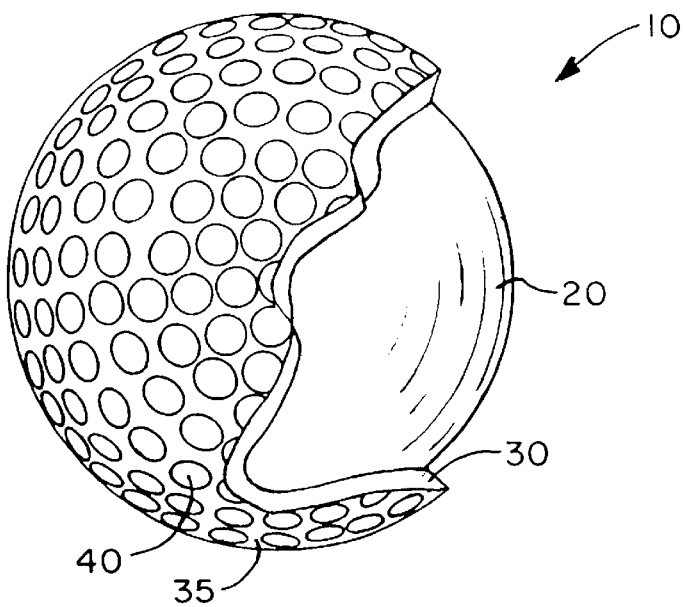
FIG. 1 is a partial sectional view of a first preferred embodiment golf ball in accordance with the present invention.

The present invention is directed to improved compositions which, when utilized in formulating golf ball cores, produce cores that exhibit increased resiliency without increasing the ball hardness. In this regard, it has been found that the use of a particular solid polybutadiene in a golf ball core composition has the effect of increasing the resiliency of the resultant cores.

The compositions of the present invention comprise one or more rubber or elastomeric components and an array of non-rubber or non-elastomeric components. The rubber components of the core compositions of the invention comprise a particular solid polybutadiene having an ultra-high Mooney viscosity and certain molecular weight characteristics described in detail below, and one or more other optional polybutadienes. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

The preferred polybutadiene resin for use in the present invention composition has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$(100° C.)], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\Sigma W_i}{\Sigma W_i / M_i}$$

where $W_i$, is the molecular weight of a fraction or sample of the polymer and $M_i$ is the total number of fractions or samples.

"Weight average molecular weight," $M_w$, is defined as:

$$M_w = \frac{\Sigma W_i M_i}{\Sigma W_i}$$

where $W_i$ and $M_i$, have the same meanings as noted above.

The "Z-average molecular weight," $M_z$, is defined as:

$$M_z = \frac{\Sigma W_i M_i^2}{\Sigma W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity," P:

$$P = \frac{M_w}{M_n}$$

Polydispersity, or "dispersity" as sometimes referred to herein, also provides an indication of the extent to which the polymer chains share the same degree of polymerization. If t he polydispersity is 1.0, then all polymer chains have the same degree of polymerization. Since weight average molecular weight is always equal to or greater than the number average molecular weight, polydispersity, by definition, is equal to or greater than 1.0:

$$P \geq 1.0$$

The particular polybutadiene for use in the preferred embodiment compositions of the present invention (i) exhibits a Mooney viscosity of from about 65 to about 85, and preferably from about 70 to about 83; ii) has a number average molecular weight $M_n$ of from about 90,000 to about 130,000; and preferably from about 100,000 to about 120,000; iii) has a weight average molecular weight $M_w$, of from about 250,000 to about 350,000; and preferably from about 290,000 to about 310,000; iv) has a Z-average molecular weight $M_z$, of about 600,000 to about 750,000; and preferably from about 660,000 to about 700,000; and, v) has a peak molecular weight $M_{peak}$ of about 150,000 to about 200,000; and preferably from about 170,000 to about 180,000.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Although not wishing to be bound to any particular theory, the present inventor has also discovered that a prefer red polybutadiene, as described herein, is obtained by utilizing a cobalt or cobalt-based catalyst. However, polybutadienes exhibiting the foregoing characteristics, which are obtained by using a lanthanum rare earth catalyst, nickel catalyst, or mixtures thereof, are also encompassed by the present invention. It is also envisioned that other catalysts could be utilized to produce the particular preferred polybutadienes described herein. Examples of such other catalysts include, but are not limited to aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which generally means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex BCP 820, from Shell Chimie of France. The properties and characteristics of this preferred polybutadiene are set forth below in Table 1.

TABLE 1

Properties of Shell Chimie BCP 820 (Also known as BR-1202J)

| Property | Value | |
|---|---|---|
| Mooney Viscosity (approximate) | 73–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.7 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex BR-1220 polybutadiene available from Shell Chemical (see Table 2 below); and Taktene 220 polybutadiene available from Bayer Corp. of Orange, Texas (see Tables 3A and 3B below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 2

Properties of Cariflex BR-1220 Polybutadiene

Physical Properties:
Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney viscosity - (35–45 Cariflex) (ML1 + 4 @ 212° F.)
90% Cure - 10.0–13.0
Polydispersity 2.75–3.0

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 3A

Properties of Taktene 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. –35–45 40 Typical
(ML1 + 4' @ 121 Deg. F./212° F.)
Specific Gravity - 0.91
Color - Transparent - almost colorless (15 APHA Max.)
Moisture % - 0.30% Max. ASTM 1416–76 Hot Mill Method

TABLE 3B

Properties of Taktene 220 Polybutadiene

| Product Description | A low Mooney viscosity, non-staining, solution polymerized, high cis-1,4-polybutadiene rubber. | | |
|---|---|---|---|
| | Property | Range | Test Method |
| Raw Polymer Properties | Mooney viscosity 1 + 4 (212° F.) | 40 ± 5 | ASTM D 1646 |
| | Volatile matter (wt %) | 0.3 max. | ASTM D 1416 |
| | Total Ash (wt %) | 0.25 max. | ASTM D 1416 |
| Cure$^{(1)(2)}$ | Minimum torque | | |
| Characteristics | $M_L$ (dN.m) | 9.7 ± 2.2 | ASTM D 2084 |
| | (lbf.in) | 8.6 ± 1.9 | ASTM D 2084 |
| | Maximum torque | | |
| | $M_H$ (dN.m) | 35.7 ± 4.8 | ASTM D 2084 |
| | (lbf.in) | 31.6 ± 4.2 | ASTM D 2084 |
| | $t_21$ (min) | 4 ± 1.1 | ASTM D 2084 |
| | t'50 (min) | 9.6 ± 2.5 | ASTM D 2084 |
| | t'90 (min) | 12.9 ± 3.1 | ASTM D 2084 |

TABLE 3B-continued

Properties of Taktene 220 Polybutadiene

| Property | | Typical Value |
|---|---|---|
| Other Product Features | Specific gravity | 0.91 |
| | Stabilizer type | Non-staining |

(1) Monsanto Rheometer at 160° C., 1.7 Hz (100 cpm), 1 degree arc, micro-die
(2) Cure characteristics determined on ASTM D 3189 MIM mixed compound:

| | |
|---|---|
| TAKTENE 220 | 100 (parts by mass) |
| Zinc oxide | 3 |
| Stearic acid | 2 |
| IRB #6 black (N330) | 60 |
| Naphthenic oil | 15 |
| TBBS | 0.9 |
| Sulfur | 1.5 |

*This specification refers to product manufactured by Bayer Corp., Orange, Texas, U.S.A.

The preferred embodiment core compositions of the present invention generally comprise about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described ultra-high Mooney viscosity polybutadiene. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl-4,4-bis(t-butylperoxy) valerate and Luperco 231 XL and Trigonox 29/40 are 1,1-di(t-butylperoxy) 3,3,5-trimethyl cyclohexane.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy weight fillers include metal particles, such as powdered tungsten.

As indicated, ground flash filler may be incorporated and is preferably 20 mesh ground up center stock from the excess flash from compression molding. It lowers the cost and may increase the hardness of the ball.

Fatty acids or metallic salts of fatty acids, or metal soaps, may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

It will be understood that the present invention golf balls may further include one or more interior or mantle layers. Such layers are usually disposed between the core and the cover components of the ball. It is also contemplated by the present inventor that the preferred ultra-high Mooney viscosity polybutadiene described herein could be utilized in one or more of these interior mantle layers.

Figure 2:
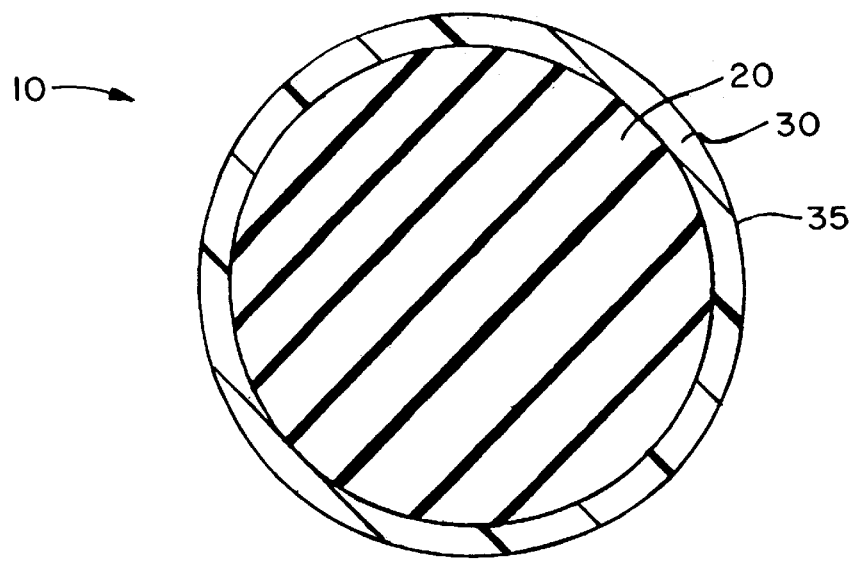
FIG. 2 is a cross sectional view of the first preferred embodiment golf ball.

The present invention is well suited for forming cores for golf balls as described herein. Referring to FIGS. 1 and 2, a first preferred embodiment golf ball 10 is illustrated. It will be understood that all figures are schematics and not necessarily to scale. The first preferred embodiment golf ball 10 comprises a core 20, most preferably as described herein, and a cover layer 30 disposed about the core 20. The core 30 includes an outer surface 35 that defines a plurality of dimples 40 along the outer surface 35 as is known in the art.

Figure 3:
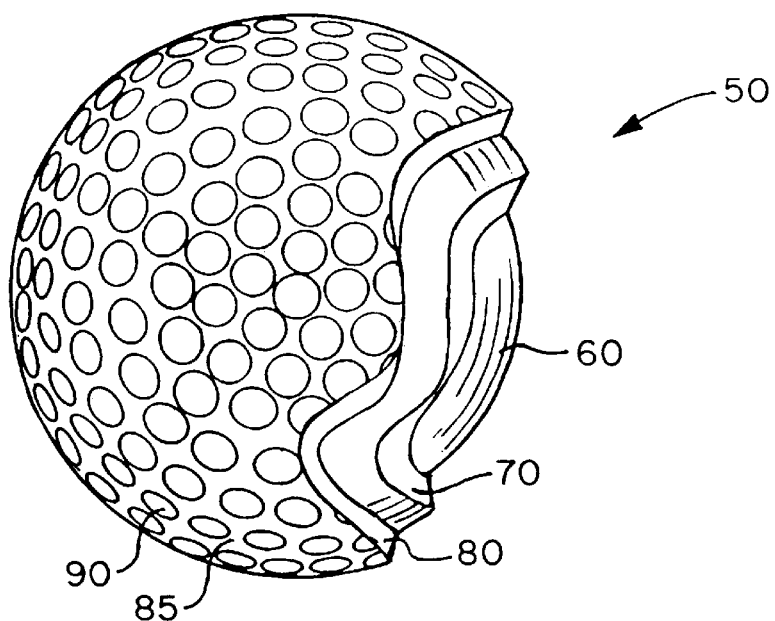
FIG. 3 is a partial sectional view of a second preferred embodiment golf ball in accordance with the present invention.
Figure 4:
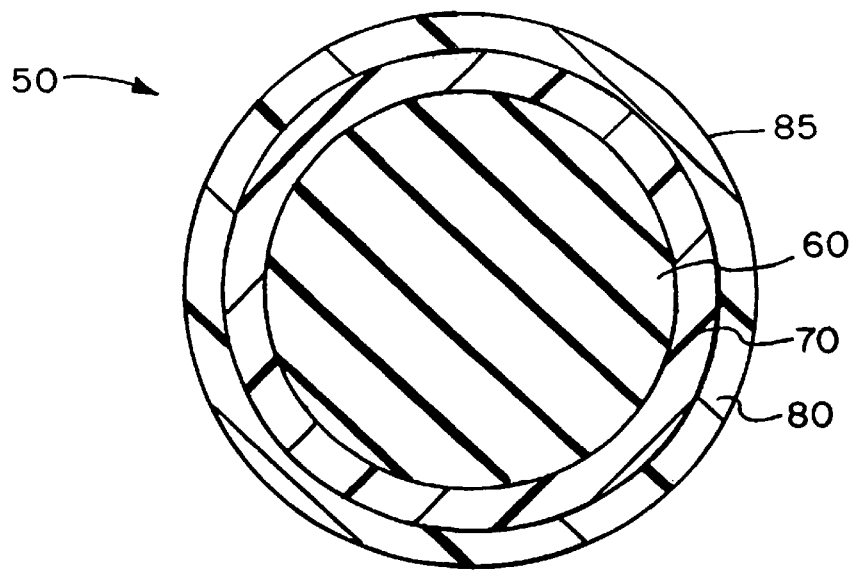
FIG. 4 is a cross sectional view of the second preferred embodiment golf ball.

The present invention core compositions are also well suited for use in multi-layer golf balls such as for example, a second preferred golf ball 50 illustrated in FIGS. 3 and 4. The second preferred embodiment golf ball 50 comprises a core 60, a first inner layer 70 disposed about the core 60, and an outer cover layer 80 disposed about the inner layer 70. The inner layer 70 may include one or more interior layers or mantles. The outer cover layer 80 may include one or more cover layers. The outer layer 80 includes an outer surface 85 that defines a plurality of dimples 90 as known in the art.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer(s), powder resin, fillers, zinc salt, metal oxide, fatty acid, and any other optional components, if desired, are blended for about 7 minutes in an internal mixer such as a Banbury mixer. As a result of shear during mixing, the temperature rises to about 200° F., whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.050 to about 0.250 inch and preferably from about 0.060 to about 0.090 inch.

The composition of the cover may vary depending upon the desired properties for the resulting golf ball. A wide array of cover formulations may be utilized such as those disclosed in U.S. Pat. Nos. 4,986,545; 5,098,105; 5,120,791; 5,187,013; 5,306,760; 5,312,857; 5,324,783; 5,328,959; 5,330,837; 5,338,610; 5,542,677; 5,580,057; 5,591,803; and 5,733,206, all of which are hereby incorporated by reference.

The covered golf ball can be formed in any one of several methods known in the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 200° F. to about 300° F.

The golf ball produced is then painted and marked, painting being effected by spraying techniques.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Using the ingredients tabled below, golf ball cores were produced by compression molding and subsequent removal of a surface layer by grinding. Each core was formulated using 100 parts elastomer (rubber). In the formulations, the amounts of remaining ingredients are expressed in parts by weight, and the coefficient of restitution (C.O.R.) and compression achieved are set forth below. The properties of the molded cores produced from each formulation were measured according to the following parameters:

Riehle compression is a measurement of the deformation of a golf ball in inches under a fixed static load of 200 pounds. For example, a Riehle compression of 47 corresponds to a deflection under load of 0.047 inches.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Durability was tested by five (5) impacts with an air cannon having a velocity of 135 ft/sec. A "pass" indicates no failure of the core after the impacts.

Tables 4 and 5 summarize the results of testing of four core compositions.

TABLE 4

Composition of Golf Ball Cores

| | Trial | | | |
|---|---|---|---|---|
| Component | 1 | 2 | 3 | 4 |
| Cariflex BR-1220[1] | 70 | 100 | — | — |
| Taktene 220[2] | 30 | — | — | 30 |
| Shell BCP 820[3] | — | — | 100 | 70 |
| ZnO (activator filler) | 31.5 | 31.5 | 31.5 | 31.5 |
| Regrind (ground flash) | 16 | 16 | 16 | 16 |
| Zn Stearate (activator) | 16 | 16 | 16 | 16 |
| ZDA (zinc diacrylate) | 21.5 | 21.5 | 21.5 | 21.5 |
| 231 XL (peroxide) | 0.90 | 0.90 | 0.90 | 0.90 |
| Total | 185.9 | 185.9 | 185.9 | 185.9 |

[1]See Table 2 for properties of Cariflex BR-1220
[2]See Table 3A and 3B for properties of Taktene 220
[3]See Table 1 for properties of Shell BCP-820

TABLE 5

Properties of Golf Ball Cores

| | Trial | | | |
|---|---|---|---|---|
| Property | 1 Control | 2 | 3 | 4 |
| Size (dia. inches) | 1.493 | 1.492 | 1.492 | 1.492 |
| Weight (grams) | 34.4 | 34.4 | 34.5 | 34.4 |
| Riehle Compression | .099 | .095 | .093 | .096 |
| C.O.R. | 0.778 | 0.781 | 0.787 | 0.782 |
| Durability | Pass | Pass | Pass | Pass |
| Nes Factor[1] | .877 | .876 | .880 | .878 |

[1]Nes Factor is the sum of the C.O.R. and Riehle compression. The higher the number the higher the resilience. This adjusts the results for compression, i.e. Trial #3 is 6 points harder than the control but is 9 points faster in C.O.R. This is a net gain of 3 points. (If the ZDA level is adjusted in each trial so that the compression is exactly the same, then trial #3 would be 3 points higher in C.O.R.)

Tables 6 and 7 summarize the results of testing of core compositions.

TABLE 6

Composition of Golf Ball Cores

| | Trial | |
|---|---|---|
| Component | 1 Control | 2 |
| Cariflex BR-1220 | 70 | — |
| Taktene 220 | 30 | — |
| Shell BCP-820 | — | 100 |
| ZnO | 31.5 | 32.0 |
| Regrind | 16 | 16 |
| Zn Stearate | 16 | 16 |
| ZDA | 21.5 | 20.5 |
| 231XL | 0.90 | 0.90 |
| Total | 185.9 | 185.4 |

TABLE 7

Properties of Golf Ball Cores

| | Trial | |
|---|---|---|
| Property | 1 Control | 2 |
| Size (dia. inches) | 1.542 | 1.543 |
| Weight (grams) | 37.8 | 38.0 |
| Riehle Compression | .093 | .093 |
| C.O.R. | 0.775 | 0.782 |
| Nes factor | .868 | .875 |

Tables 6 and 7 demonstrate that when the ZDA level is adjusted to obtain the same Riehle compression as the Control, the C.O.R. increased 7 points higher for the BCP-820 and the Nes Factor was also 7 points higher.

Tables 8 and 9 summarize the results of additional testing of core compositions.

TABLE 8

Composition of Golf Ball Cores

| | Trial | | |
|---|---|---|---|
| Component | 1 Control | 2 | 3 |
| Cariflex BR-1220 | 70 | 100 | — |
| Taktene 220 | 30 | — | — |
| Shell BCP-820 | — | — | 100 |
| ZnO | 31.5 | 31.7 | 31.8 |
| Regrind | 16 | 16 | 16 |
| Zn Stearate | 16 | 16 | 16 |
| ZDA | 21.5 | 21.1 | 19.9 |
| 231 XL | 0.90 | 0.90 | 0.90 |
| Total | 185.9 | 185.7 | 184.6 |

TABLE 9

Properties of Golf Ball Cores

| | Trial | | |
|---|---|---|---|
| Property | 1 Control | 2 | 3 |
| Size (dia. inches) | 1.493 | 1.493 | 1.494 |
| Weight (grams) | 34.5 | 34.4 | 34.3 |

TABLE 9-continued

Properties of Golf Ball Cores

| | Trial | | |
|---|---|---|---|
| Property | 1 Control | 2 | 3 |
| Riehle Compression | .098 | .104 | .106 |
| C.O.R. | 0.777 | 0.773 | 0.776 |
| Nes Factor | .875 | .877 | .882 |

Tables 8 and 9 demonstrate that, despite adjusting the ZDA level, the Riehle compressions were different. However, the Nes Factor shows that Trial #3 using 100% BCP-820 is 7 points higher than the Control.

Table 10 summarizes additional testing.

TABLE 10

Composition of Golf Ball Cores

| | Trial | |
|---|---|---|
| Component | 1 Control | 2 |
| Cariflex BR-1220 | 70 | — |
| Taktene 220 | 30 | — |
| BCP-820 | — | 100 |
| ZnO | 31.5 | 31.8 |
| Regrind | 16 | 16 |
| Zn Stearate | 16 | 16 |
| ZDA | 20 | 19.4 |
| 231 XL | 0.90 | 0.90 |
| TOTAL | 184.4 | 184.1 |

Tables 11A–11D and 12 summarize the resulting balls and their components.

TABLE 11A

Properties of Cores, Mantled Cores, Molded and Finished Balls

| | Trial | |
|---|---|---|
| Core Property | 1 Control | 2 |
| Size (dia. inches) | 1.508 | 1.511 |
| Weight (grams) | 35.4 | 35.7 |
| Riehle Compression | .105 | 98 |
| C.O.R. | 0.771 | 0.781 |
| Nes Factor | .876 | .879(+3) |

Cores were centerless ground to 1.470" and injection molded with a high modulus clear ionomer mantle. See Table 12 for mantle composition.

TABLE 11B

| Mantled Cores | 1 Control | 2 |
|---|---|---|
| Size (dia. inches) | 1.568 | 1.570 |
| Weight (grams) | 38.4 | 38.4 |
| Riehle Compression | .085 | .081 |
| C.O.R. | 0.802 | 0.808 |
| Nes Factor | .887 | .889(+2) |

Mantled cores were injection molded with a soft, low modulus ionomer cover into dimpled molded golf balls. See Table 12 for cover composition.

TABLE 11C

| Molded Golf Balls | 1 Control | 2 |
|---|---|---|
| Size (dia. inches) | 1.683 | 1.683 |
| Weight (grams) | 45.3 | 45.4 |
| Riehle Compression | .081 | .080 |
| C.O.R. | 0.787 | 0.792 |
| Nes Factor | .868 | .872(+4) |

Molded balls were trimmed, brush tumbled, primed, stamped, and clear coated.

TABLE 11D

| Finished Golf Balls | 1 Control | 2 |
|---|---|---|
| Size (dia. inches) | 1.682 | 1.682 |
| Weight (grams) | 45.6 | 45.7 |
| Riehle Compression | .080 | .080 |
| C.O.R. | 0.786 | 0.790 |
| Nes Factor | .866 | .870(+4) |

TABLE 12

Composition of Mantle and Cover

| Mantle Component | |
|---|---|
| Iotek 1002/5031 | 50 |
| Iotek 1003/5041 | 50 |
| | 100 |
| Cover Component | |
| Iotek 7510 | 41 |
| Iotek 7520 | 41 |
| Iotek 8000 | 8.5 |
| T.G. White M.B. | 9.4 |
| | 99.9 |

It is evident from the proceeding tables that the high Mooney cobalt catalyzed polybutadiene BCP820 produces a higher C.O.R. (3–7 points) vs. the low Mooney cobalt catalyzed polybutadiene. Blending with the low Mooney polybutadiene produces less of a gain in C.O.R.

The invention has been described with reference to the preferred embodiments. Obviously, modifications and alterations will occur to others upon reading and understanding the preceding detailed description. It is intended that the invention includes all such alternations and modifications insofar as they come within the scope of the claims and the equivalents thereof.

Having thus described the preferred embodiment, the invention is now claimed to be:

1. A golf ball comprising:

a core formed from a composition including a solid polybutadiene, a cross-linking agent, a metal soap and zinc oxide, wherein said polybutadiene, prior to curing of said core, has a polydispersity of from about 1.9 to about 3.9 and a Mooney viscosity [$ML_{1+4}$ (100° C.)] of greater than 70; and one or more cover layers disposed about said core.

2. The golf ball of claim 1 wherein said polybutadiene, prior to curing of said core, has a number average molecular weight of from about 90,000 to about 130,000.

3. A method for producing a golf ball, said method comprising:

combining a solid polybutadiene having a Mooney viscosity [$ML_{1+4}(100°\ C.)$] of from about 73 to about 85 and having a polydispersity of from about 1.9 to about 3.9, with at least one other component to form a core composition;

molding said core composition to form a golf ball core; and forming a cover comprising one or more cover layers about said golf ball core to produce said golf ball.

4. The golf ball produced by the method of claim 3.

5. A golf ball comprising:

a core formed from a composition including polybutadiene, said polybutadiene consisting essentially of a solid polybutadiene and wherein said polybutadiene prior to curing, has a Mooney viscosity ($ML_{1+4}(100°\ C.)$) of from about 73 to about 83 and a polydispersity of less than 4; and one or more cover layers disposed about said core.

6. A golf ball comprising:

a core formed from a composition including polybutadiene, said polybutadiene consisting essentially of a solid polybutadiene and wherein said polybutadiene prior to curing, has a Mooney viscosity ($ML_{1+4}(100°\ C.)$) of greater than 70 and a polydispersity of less than 4; and one or more cover layers disposed about said core, wherein said polybutadiene, prior to curing, has a number average molecular weight of from about 90,000 to about 130,000.

7. The golf ball of claim 6 wherein said polybutadiene has a number average molecular weight of from about 100,000 to about 120,000.

8. A golf ball comprising:

a core formed from a composition including polybutadiene, said polybutadiene consisting essentially of a solid polybutadiene and wherein said polybutadiene prior to curing, has a Mooney viscosity ($ML_{1+4}(100°\ C.)$) of greater than 70 and a polydispersity of less than 4; and one or more cover layers disposed about said core, wherein said polybutadiene, prior to curing, has a weight average molecular weight of from about 250,000 to about 350,000.

9. The golf ball of claim 8 wherein said polybutadiene has a weight average molecular weight of from about 290,000 to about 310,000.

10. A golf ball comprising:

a core formed from a composition including polybutadiene, said polybutadiene consisting essentially of a solid polybutadiene and wherein said polybutadiene prior to curing, has a Mooney viscosity ($ML_{1+4}(100°\ C.)$) of greater than 70 and a polydispersity of less than 4; and one or more cover layers disposed about said core, wherein said polybutadiene, prior to curing, has a Z-average molecular weight of from about 600,000 to about 750,000.

11. The golf ball of claim 10 wherein said polybutadiene has a Z-average molecular weight of from about 660,000 to about 700,000.

12. A golf ball comprising:

a core formed from a composition including polybutadiene, said polybutadiene consisting essentially of a solid polybutadiene and wherein said polybutadiene prior to curing, has a Mooney viscosity ($ML_{1+4}(100°\ C.)$) of greater than 70 and a polydispersity of less than 4; and one or more cover layers disposed about said core, wherein said polybutadiene, prior to curing, has a peak molecular weight of from about 150,000 to about 200,000.

13. The golf ball of claim 12 wherein said polybutadiene has a peak molecular weight of from about 170,000 to about 180,000.

14. A golf ball comprising:

a core formed from a composition including (i) from about 80 parts to about 120 parts by weight of elastomer components, said elastomer components including a polybutadiene, wherein said polybutadiene consists essentially of a solid polybutadiene, which prior to curing, exhibits a Mooney viscosity [$ML_{1+4}(100°\ C.)$] of from about 73 to about 85 and a polydispersity of about 1.9 to about 3.9, and (ii) at least about 60 parts by weight of non-elastomer components; and one or more resin cover layers disposed about said core.

15. The golf ball of claim 14 wherein said polybutadiene is polymerized in the presence of a catalyst selected from the group consisting of cobalt catalyst, lanthanum catalyst, nickel catalyst, aluminum catalyst, boron catalyst, lithium catalyst, titanium catalyst, and combinations thereof.

16. The golf ball of claim 15 wherein said polybutadiene is polymerized in the presence of a cobalt catalyst.

17. The golf ball of claim 14 wherein said compbsition includes (i) about 100 parts by weight of elastomer components and (ii) from about 60 to about 80 parts by weight of non-elastomer components.

18. The golf ball of claim 14 wherein said polybutadiene, prior to curing, has a Mooney viscosity of from about 73 to about 83.

19. The golf ball of claim 14 wherein said polybutadiene, prior to curing, has a polydispersity of from about 1.9 to about 3.7.

20. The golf ball of claim 19 wherein said polybutadiene has a polydispersity of from about 2.4 to about 3.1.

21. The golf ball of claim 18 wherein said polybutadiene has a polydispersity of about 2.7.

\* \* \* \* \*

UNITED STATES PATENT AND TRADEMARK OFFICE
CERTIFICATE OF CORRECTION

PATENT NO.    : 6,277,920 B1
DATED         : August 21, 2001
INVENTOR(S)   : R. Dennis Nesbitt It is certified that error appears in the above-identified patent and that said Letters Patent is hereby corrected as shown below:

<u>Title page,</u>
Item [63], "Continuation-in-part of application No. 08/819,945, filed on May 18, 1997" should read -- Continuation-in-part of application No. 08/819,945, filed on March 18, 1997 --.

Signed and Sealed this

Sixth Day of August, 2002

*Attest:*

*Attesting Officer*

JAMES E. ROGAN
*Director of the United States Patent and Trademark Office*